US009087212B2

(12) United States Patent
Balakrishnan et al.

(10) Patent No.: US 9,087,212 B2
(45) Date of Patent: Jul. 21, 2015

(54) METHODS AND APPARATUS FOR SECURING A DATABASE

(75) Inventors: Hari Balakrishnan, Belmont, MA (US); Raluca Ada Popa, Cambridge, MA (US); Nickolai Zeldovich, Allston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 600 days.

(21) Appl. No.: 13/357,988

(22) Filed: Jan. 25, 2012

(65) Prior Publication Data

US 2013/0191650 A1    Jul. 25, 2013

(51) Int. Cl.
*H04L 29/06* (2006.01)
*G06F 21/62* (2013.01)
*H04L 9/00* (2006.01)

(52) U.S. Cl.
CPC ............ *G06F 21/6227* (2013.01); *H04L 9/008* (2013.01); *G06F 2221/2107* (2013.01)

(58) Field of Classification Search
USPC ............... 726/26–30; 713/153, 165, 189–194
See application file for complete search history.

(56) References Cited

U.S. PATENT DOCUMENTS

| 2004/0243816 | A1* | 12/2004 | Hacigumus et al. | 713/193 |
| 2004/0255133 | A1* | 12/2004 | Lei et al. | 713/193 |
| 2008/0033960 | A1* | 2/2008 | Banks et al. | 707/9 |
| 2008/0133935 | A1* | 6/2008 | Elovici et al. | 713/193 |
| 2010/0146299 | A1* | 6/2010 | Swaminathan et al. | 713/189 |
| 2012/0131075 | A1* | 5/2012 | Mawdsley et al. | 707/825 |
| 2012/0159180 | A1* | 6/2012 | Chase et al. | 713/183 |
| 2013/0151861 | A1* | 6/2013 | Gan | 713/189 |
| 2013/0179684 | A1* | 7/2013 | Furukawa | 713/165 |
| 2013/0262863 | A1* | 10/2013 | Yoshino et al. | 713/165 |

OTHER PUBLICATIONS

Stefan Hildenbrand, Donald Kossman, Tahmineh Sanarad, Carsten Binnig, Franz Faerber, and Johannes Woehler, "Query Processing on Encrypted Data in the Cloud", Swiss Federal Institute of Technology Zurich, Sep. 12, 2011, pp. 1-13.*
Raluca Ada Popa, Catherine M.S. Redfield, Nickolai Zeldovich, and Hari Balakrishnan, "CryptDB: Protecting Confidentiality with Encrypted Query Processing", ACM, Oct. 23-26, 2011.*

* cited by examiner

*Primary Examiner* — Joseph P Hirl
*Assistant Examiner* — Chi Nguy
(74) *Attorney, Agent, or Firm* — Daly, Crowley, Mofford & Durkee, LLP

(57) ABSTRACT

Methods and apparatus for a system to maintain confidentiality of data in a database management system by selecting encryption schemes for data items, storing encrypted data in databases, transforming SQL queries to run over encrypted data, and executing queries over encrypted data on the database server.

32 Claims, 8 Drawing Sheets

PRINCTYPE physical_user EXTERNAL;
PRINCTYPE user, msg;

CREATE TABLE *privmsgs* (
  *msgid*   int,
  *subject* varchar(255) ENC_FOR (*msgid* msg),
  *msgtext* text          ENC_FOR (*msgid* msg) );

CREATE TABLE *privmsgs_to* (
  *msgid* int, *rcpt_id* int, *sender_id* int,
  (*sender_id* user) SPEAKS_FOR (*msgid* msg),
  (*rcpt_id* user)   SPEAKS_FOR (*msgid* msg) );

CREATE TABLE *users* (
  *userid* int, *username* varchar(255),
  (*username* physical_user) SPEAKS_FOR (*userid* user) );

Example table contents, without anonymized column names:

Table *privmsgs*

| msgid | subject | msgtext |
|---|---|---|
| 5 | xcc82fa | x37a21f |

Table *privmsgs_to*

| msgid | rcpt_id | sender_id |
|---|---|---|
| 5 | 1 | 2 |

Table *users*

| userid | username |
|---|---|
| 1 | 'Alice' |
| 2 | 'Bob' |

*FIG. 4*

```
PRINCTYPE physical_user EXTERNAL;
PRINCTYPE user, group, forum_post, forum_name;

CREATE TABLE users      ( userid int, username varchar(255),
(username physical_user) SPEAKS_FOR (userid user) );

CREATE TABLE usergroup ( userid int, groupid int,
(userid user) SPEAKS_FOR (groupid group) );

CREATE TABLE aclgroups ( groupid int, forumid int, optionid int,
(groupid group) SPEAKS_FOR (forumid forum_post)
    IF optionid=20,
(groupid group) SPEAKS_FOR (forumid forum_name)
    IF optionid=14);

CREATE TABLE posts      ( postid int, forumid int,
post text ENC_FOR (forumid forum_post) );

CREATE TABLE forum     ( forumid int,
name varchar(255) ENC_FOR (forumid forum_name) );
```

*FIG. 5*

```
PRINCTYPE physical_user EXTERNAL;
PRINCTYPE contact, review;

CREATE TABLE ContactInfo  ( contactId int, email varchar(120),
(email physical_user) SPEAKS_FOR (contactId contact) );

CREATE TABLE PCMember    ( contactId int );
CREATE TABLE PaperConflict ( paperId int, contactId int );
CREATE TABLE PaperReview (
  paperId      int,
  reviewerId   int   ENC_FOR (paperId review),
  commentsToPC text ENC_FOR (paperId review),
  (PCMember.contactId contact) SPEAKS_FOR
    (paperId review) IF NoConflict(paperId, contactId) );

NoConflict (paperId, contactId):     /* Define a SQL function */
(SELECT COUNT(*) FROM PaperConflict c WHERE
  c.paperId = paperId AND c.contactId = contactId) = 0;
```

*FIG. 6*

|                 | Databases | Tables  | Columns   |
|-----------------|-----------|---------|-----------|
| Complete schema | 8,548     | 177,154 | 1,244,216 |
| Used in query   | 1,193     | 18,162  | 128,840   |

*FIG. 7*

| Application | Annotations | Login/logout code | Sensitive fields secured, and examples of such fields |
|---|---|---|---|
| phpBB | 31 (11 unique) | 7 lines | 23: private messages (content, subject), posts, forums |
| HotCRP | 29 (12 unique) | 2 lines | 22: paper content and paper information, reviews |
| grad-apply | 111 (13 unique) | 2 lines | 103: student grades (61), scores (17), recommendations, reviews |
| TPC-C (single princ.) | 0 | 0 | 92: all the fields in all the tables encrypted |

*FIG. 8*

| Application | Total cols. | Consider for enc. | Needs plaintext | Needs HOM | Needs SEARCH | Non-plaintext cols. with MinEnc: | | | | Most sensitive cols. at HIGH |
|---|---|---|---|---|---|---|---|---|---|---|
| | | | | | | RND | SEARCH | DET | OPE | |
| phpBB | 563 | 23 | 0 | 1 | 0 | 21 | 0 | 1 | 1 | 6 / 6 |
| HotCRP | 204 | 22 | 0 | 2 | 1 | 18 | 1 | 6 | 2 | 18 / 18 |
| grad-apply | 706 | 103 | 0 | 0 | 2 | 95 | 0 | 12 | 2 | 94 / 94 |
| OpenEMR | 1,297 | 566 | 7 | 0 | 3 | 526 | 2 | 4 | 19 | 525 / 540 |
| MIT 6.02 | 15 | 13 | 0 | 0 | 0 | 7 | 0 | 4 | 2 | 1 / 1 |
| PHP-calendar | 25 | 12 | 2 | 0 | 2 | 3 | 2 | 4 | 1 | 3 / 4 |
| TPC-C | 92 | 92 | 0 | 8 | 0 | 65 | 0 | 19 | 8 | — |
| Trace from sql.mit.edu | 128,840 | 128,840 | 1,094 | 1,019 | 1,125 | 80,053 | 350 | 34,212 | 13,131 | — |
| ... with in-proxy processing | 128,840 | 128,840 | 571 | 1,016 | 1,135 | 84,008 | 398 | 35,350 | 8,513 | — |
| ... col. name contains *pass* | 2,029 | 2,029 | 2 | 0 | 0 | 1,936 | 0 | 91 | 0 | — |
| ... col. name contains *content* | 2,521 | 2,521 | 0 | 0 | 52 | 2,215 | 52 | 251 | 3 | — |
| ... col. name contains *priv* | 173 | 173 | 0 | 4 | 0 | 159 | 0 | 12 | 2 | — |

*FIG. 9*

METHODS AND APPARATUS FOR SECURING A DATABASE

BACKGROUND

As is known in the art, online applications are vulnerable to theft of sensitive information because adversaries can exploit software bugs to gain access to private data, and because curious or malicious administrators may capture and leak data. Theft of private information is a significant problem, particularly for online applications. An adversary can exploit software vulnerabilities to gain unauthorized access to servers; curious or malicious administrators at a hosting or application provider can snoop on private data; and attackers with physical access to servers can access all data on disk and in memory.

One known approach to reduce the damage caused by server compromises is to encrypt sensitive data stored on a server and run all computations (application logic) on clients. Unfortunately, several important applications do not lend themselves to this approach, including database-backed web sites that process queries to generate data for the user, and applications that compute over large amounts of data. Even when this approach is tenable, converting an existing server-side application to this form can be difficult. Another approach would be to consider theoretical solutions such as fully homomorphic encryption, which allows servers to compute arbitrary functions over encrypted data, while only clients see decrypted data. However, fully homomorphic encryption schemes are still prohibitively expensive by orders of magnitude.

As is known in the art, SQL (Structured Query Language) is a programming language designed for managing data in relational database management systems (RDBMS). SQL includes data insert, query, update and delete, schema creation and modification, and data access control. The SQL language is sub-divided into several language elements, including: clauses, which are constituent components of statements and queries, expressions, which can produce either scalar values or tables with columns and rows of data, predicates, which specify conditions that can be evaluated to SQL three-valued logic or Boolean, and queries to retrieve data based on specific criteria, and statements. Queries are performed with a declarative SELECT statement to retrieve data from one or more tables, or expressions. Queries allow the user to describe desired data, leaving the database management system (DBMS) responsible for planning, optimizing, and performing the physical operations necessary to produce that result as it chooses.

SUMMARY

Exemplary embodiments of the invention provide methods and apparatus for processing database queries. An exemplary method comprises encrypting a database in a database system using two or more encryption schemes, with each data item in the database encrypted using at least one of the two or more encryption schemes, and selecting for each data item specified in an input query from an application, one of the encryption schemes. The exemplary method further includes transforming the input query to an encrypted query using the selected encryption scheme for each data item specified in the query, and executing the encrypted query at the database system, without decrypting any of the encrypted data items to plaintext at the database system, to produce one or more encrypted results. The exemplary method also includes decrypting the encrypted results using the selected decryption scheme for each data item in the encrypted results to generate decrypted results, and returning the decrypted results to the application.

In one embodiment, the selection and transforming steps above are performed in a database proxy placed between the application and the database server. In another embodiment, these steps are done in the application or in an Object-Relational Mapper (ORM) layer or library, for example. In yet another embodiment, these steps are performed in a database server. It is understood that a variety of alternative embodiments are contemplated to meet the needs of a particular application.

It is understood that the step of selecting refers to data items "specified in" a query, meaning data items directly mentioned in the query, such as a value of a record, as well as data items specified by reference, for example in a predicate. A relational query language such as SQL allows queries to refer to data items in different ways, and "specified in" a query encompasses all these ways of specifying data items.

It is understood that the term "encryption scheme" includes some subset of RND, DET, HOM, OPE, JOIN, SEARCH capabilities and can include additional capabilities. Two different schemes that provide the same capability would be considered equivalent. Moreover, it is understood that using multiple encryption schemes, storing them separately or in onion layers as described below, may be performed with schemes that provide capabilities other than the ones listed above. Additional encryption schemes, allowing the database server to perform other kinds of computations, are also possible.

In one aspect of the invention, a method comprises storing encrypted data in a database management system with layers of encryption to support different functionality for a first item of data, executing a query from an application such that encryption of the data is transparent to the application by: intercepting the query at a proxy between the application and the database management system, and, modifying the query to encrypt data to the database management and decrypt data from the database management system to provide query results to the application, selecting a first one of the layers of encryption based upon the query, and adjusting the layers of encryption based upon the query.

The method can further include one or more of the following features: selecting the first one of the layers of encryption based upon the operations required by the query, the layers of encryption include increasing a level of functionality of the encryption moving toward inner layers of the encryption layers, the layers of encryption include increasing a level of security of the encryption moving toward outer layers of the encryption layers, providing a cryptographic primitive to enable the proxy to provide a token to the database management system for adjusting an encryption of a stored first column initially encrypted with a first key to an encryption with a second key different than the first key, the database management system does not learn the first or second keys or content of the data in the first column, providing an annotation language to capture application access control at a granularity of the query, including enforcing application access control cryptographically by encrypting data items in a way decryptable only with user passwords using key chaining, and/or receiving a user-defined function to enable the database management system to process encrypted data and unencrypted data without change to the database management system.

In another aspect of the invention, an article comprises: a computer-readable medium containing non-transitory stored instructions that enable a machine to perform: storing encrypted data in a database management system with layers of encryption to support different functionality for a first item of data, executing a query from an application such that encryption of the data is transparent to the application by: intercepting the query at a proxy between the application and the database management system, and modifying the query to encrypt data to the database management and decrypt data from the database management system to provide query results to the application, selecting a first one of the layers of encryption based upon the query, and adjusting the layers of encryption based upon the query.

The article can further include one or more of the following features: instructions for selecting the first one of the layers of encryption based upon the operations required by the query, the layers of encryption include increasing a level of functionality of the encryption moving toward inner layers of the encryption layers, the layers of encryption include increasing a level of security of the encryption moving toward outer layers of the encryption layers, instructions for providing a cryptographic primitive to enable the proxy to provide a token to the database management system for adjusting an encryption of a stored first column initially encrypted with a first key to an encryption with a second key different than the first key, the database management system does not learn the first or second keys or content of the data in the first column, instructions for processing an annotation language to capture application access control at a granularity of the query, instructions for enforcing application access control cryptographically by encrypting data items in a way decryptable only with user passwords using key chaining, and/or instructions for receiving a user defined function to enable the database management system to process encrypted data and unencrypted data without change to the database management system.

In a further aspect of the invention, a system to maintain confidentiality of data in a database management system comprises a key setup module for coupling to an application, a database proxy for coupling to the application, the database proxy to intercept SQL queries from the application and change the queries to encrypt data to a database management system and decrypt data from the database management system, an active key module coupled to the database proxy, the active key module containing information only for users that are logged on to the application, annotated schema coupled to the database proxy to define principals having keys in the active key module, the annotated schema to use the keys to decrypt different parts of the database, a defined function module for coupling to a database management system, the defined function module to perform cryptographic operations on the data in the database management system, and an encrypted key table for coupling to the database management system. The system can further include the database proxy comprising onions of encryption to provide adjustable query-based encryption, and/or keys in the active key module are chained to user passwords so that the data in the database management system can only be decrypted for users that are logged into the application.

In another aspect of the invention, a method comprises receiving a query from an application, intercepting the query at a proxy, rewriting, by the proxy, the query to anonymize each table and column name, encrypting constants in the query using a master key with an encryption scheme based upon the operations for the query, determining, by the proxy, whether the database management system should be given keys to adjust encryption layers before executing the query, issuing a modified query at the database management system that invokes a user defined function to adjust an encryption layer of the appropriate columns, forwarding, by the proxy, the rewritten query to the database management system, receiving query results from the database management system, and decrypting, by the proxy, the query results and returning the decrypted query results to the application.

BRIEF DESCRIPTION OF THE DRAWINGS

The foregoing features of this invention, as well as the invention itself, may be more fully understood from the following description of the drawings in which:

FIG. 4 is an exemplary schema with annotation to secure private messages;

FIG. 5 is an exemplary annotated schema for securing access to posts;

FIG. 6 is an exemplary annotated schema for securing reviews;

FIG. 7 is a tabular representation of a databases, tables, and columns for exemplary server;

FIG. 8 is a tabular representation of annotations to be added by a programmer to secure certain fields for an exemplary environment;

FIG. 9 is a tabular representation of steady-state onion levels for database columns required for various applications.

DETAILED DESCRIPTION

In general, exemplary embodiments of the invention provide a system that provides defense against attacks for applications backed by SQL (Structured Query Language) databases. SQL queries are executed over encrypted data using a collection of efficient SQL-aware encryption schemes. Multiple SQL-aware encryption embodiments are stacked together using onions of encryption. As a result, a database administrator cannot access decrypted data.

In one embodiment, the system can chain encryption keys to user passwords, so that a data item can be decrypted only by using the password of one of the users with access to that data. Even if all servers are compromised, an adversary cannot decrypt the data of any user who is not logged in.

Figure 1:
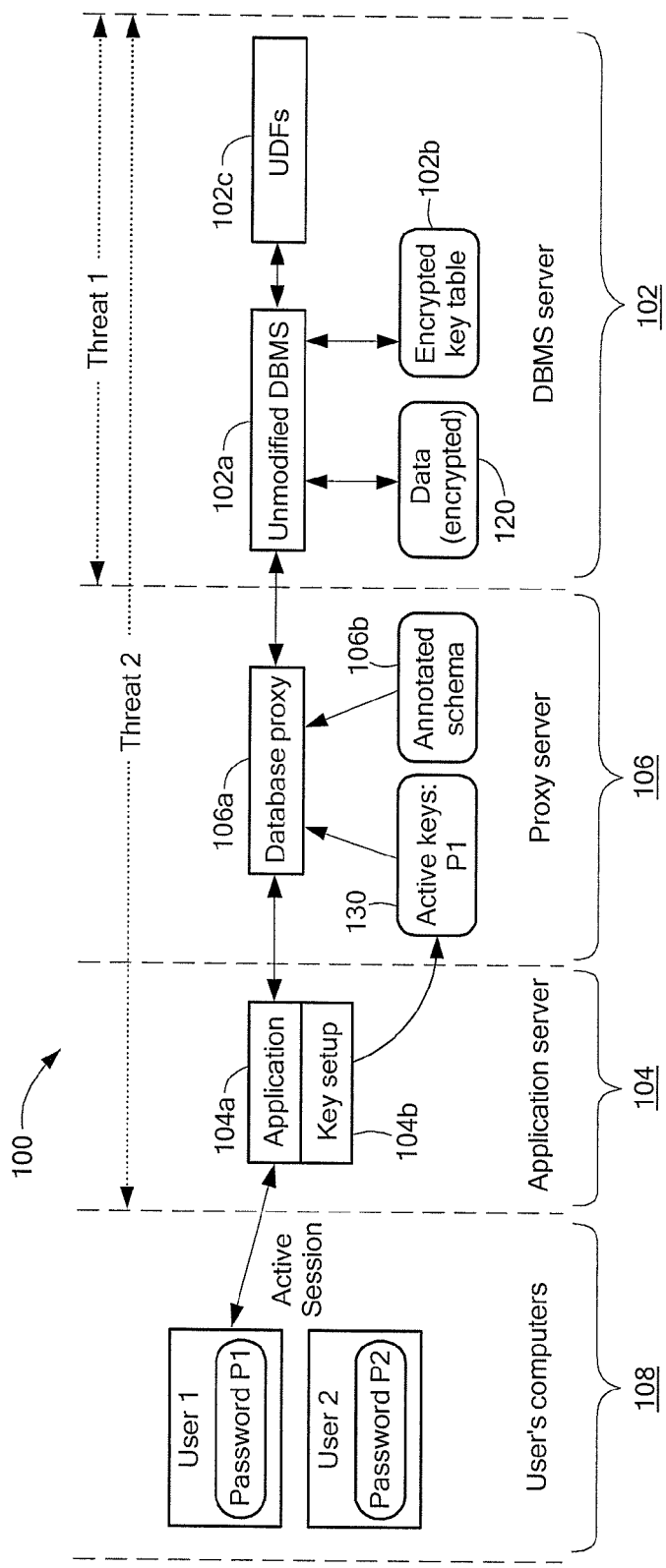
FIG. 1 is a schematic representation of an exemplary system that provides defense against attacks for applications backed by SQL (Structured Query Language) databases.

FIG. 1 shows an exemplary embodiment of a database system 100 providing confidentiality in accordance with exemplary embodiments of the invention. A DBMS (database management system) 102 is connected to a separate application server 104, which runs the application code and issues DBMS queries on behalf of one or more users. Queries are executed over encrypted data. As is known, SQL uses a well-defined set of operators. In accordance with exemplary embodiments of the invention, most of the commonly used SQL operators can be supported efficiently over encrypted data, as described more fully below.

The system 100 includes a proxy server 106 coupled between the DBMS server 102 and the application server 104. Users 108 are connected to the application server 104. It is understood that the coupling does not need to be strong; it can be over the Internet. It is further understood that the application server and the user computers can be the same. The system utilizes user-defined functions (UDFs) 102c, which are described below, to perform cryptographic operations in the DBMS 102. It is understood that rectangular and rounded boxes represent processes and data, respectively. Vertical dashed lines indicate separation between user computers 108, the application server 104, a server running the database proxy 106, which may be the same as the application server, and the DBMS server 102.

The application server 104 includes an application 104a and an optional key setup module 104b. The database proxy server 106 includes a database proxy 106a coupled to an active key module 130 and, optionally, an annotated schema 106b. The DBMS server 102 includes an (unmodified) DMBS 102a and encrypted data 120. An optional encrypted key table 102b and UDFs 102c can be coupled to the DBMS 102a.

Two examples of threats addressed by the inventive system 100 are shown as dotted lines: Threat 1 and Threat 2. In Threat 1, a curious database administrator with complete access to the DBMS server 102 snoops on private data, in which case the system prevents the DBA from accessing any private information. In Threat 2, an adversary gains complete control over both the software and hardware of the application 104, proxy 106, and DBMS servers 102, in which case the system ensures the adversary cannot obtain data belonging to users that are not logged in (e.g., user 2).

Figure 2:
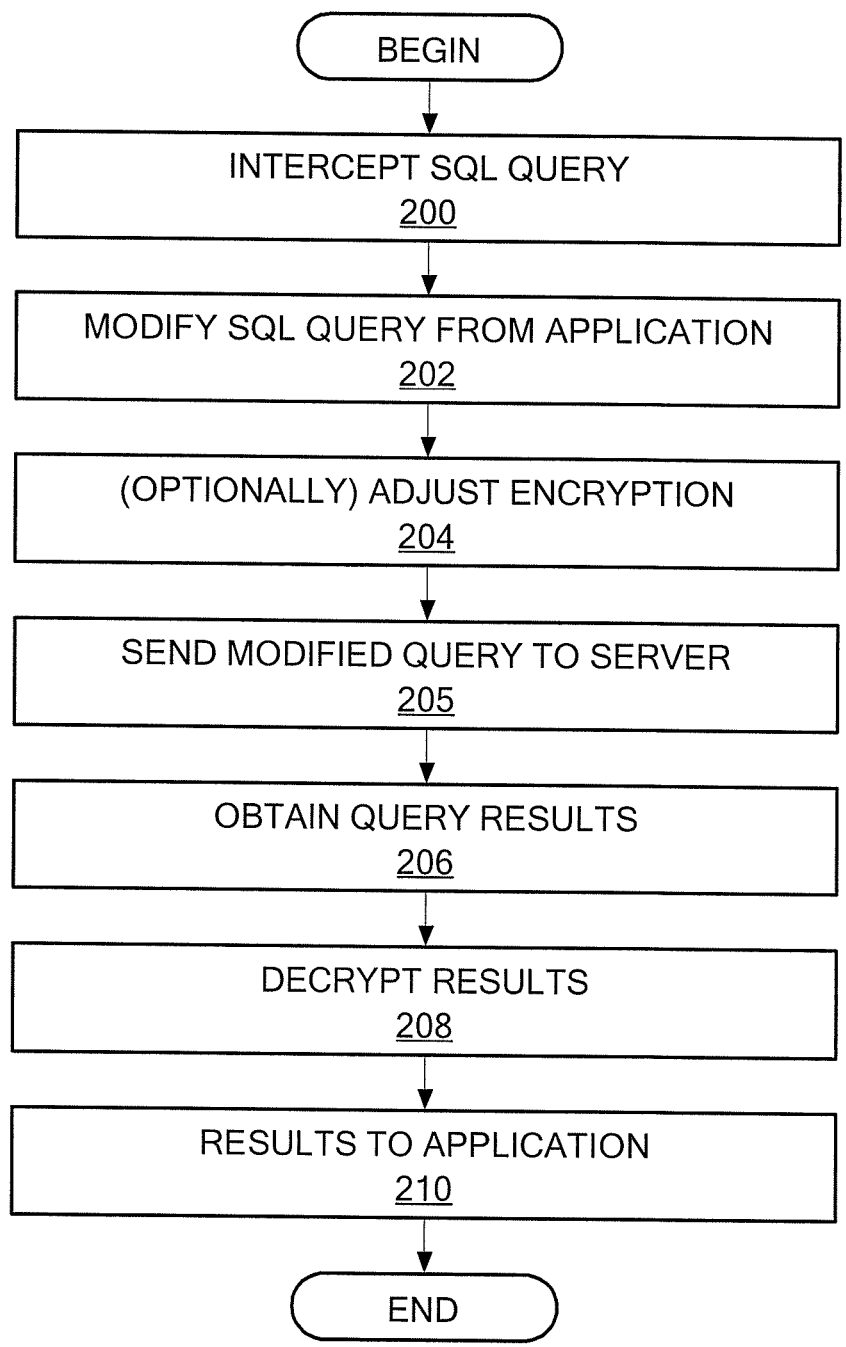
FIG. 2 is a flow diagram showing an exemplary sequence of steps for implementing data confidentiality.

FIG. 2, in combination with FIG. 1, shows an exemplary high-level sequence of steps for implementing database confidentiality in accordance with exemplary embodiments of the invention. In step 200, a database proxy 106 intercepts SQL queries and rewrites the queries in step 202 to execute on encrypted data. The encryption level is optionally adjusted in step 204 as necessary. The modified query is sent to the server in step 205 and the server returns the query results in step 206. In step 208, the proxy 106 decrypts the query result from the database and sends the plaintext query result to the initiating application 104. In general, the database proxy 106 encrypts and decrypts all data, and changes some query operators, while preserving the semantics of the query. The DBMS server 102 never receives decryption keys to the plaintext so it never sees sensitive data, ensuring that a curious DBA cannot gain access to private information (threat 1). The above is described in further detail below.

To guard against application, proxy, and DBMS server compromises (as in threat 2), developers annotate their SQL schema to define different principals, whose keys will allow decrypting different parts of the database. They also make a small change to their applications to provide encryption keys to the proxy, as described below. The proxy 106 determines what parts of the database should be encrypted under what key. The result is that the system guarantees the confidentiality of data belonging to users that are not logged in during a compromise (e.g., user 2 in FIG. 1), and who do not log in until the compromise is detected and fixed by the administrator.

One challenge in combating these threats lies in the tension between minimizing the amount of confidential information revealed to the DBMS server and the ability to efficiently execute a variety of queries. Conventional approaches for computing over encrypted data are either too slow or do not provide adequate confidentiality. On the other hand, encrypting data with a strong and efficient cryptosystem, such as AES, would prevent a DBMS server from executing many SQL queries, such as queries that ask for the number of employees in the "sales" department or for the names of employees whose salary is greater than $60,000. In this case, the only practical solution would be to give the DBMS server access to the decryption key, but that would allow an adversary to also gain access to all data.

Another challenge is to minimize the amount of data leaked when an adversary compromises the application server in addition to the DBMS server. Since arbitrary computation on encrypted data is not practical, the application must be able to access decrypted data. The difficulty is ensuring that a compromised application can obtain only a limited amount of decrypted data. A naive solution of assigning each user a different database encryption key for their data does not work for applications with shared data, such as bulletin boards and conference review sites.

Another challenge is to minimize the amount of change to existing database management systems systems, to make the system easier to deploy on different database management systems and to take advantage of their existing optimizations.

Exemplary embodiments of the invention address the challenged discussed above. In one aspect of the invention, the inventive system executes SQL queries over encrypted data by using a SQL-aware encryption strategy, which leverages the fact that all SQL queries are made up of a well-defined set of primitive operators, such as equality checks, order comparisons, aggregates (sums), and joins. By adapting known encryption schemes (for equality, additions, and order checks) and using a new privacy-preserving cryptographic method for joins, the system encrypts each data item in a way that allows the DBMS to execute on the transformed data. The system is efficient because it mostly uses symmetric-key encryption, and avoids fully homomorphic encryption. In one embodiment it runs on unmodified DBMS software (by using user-defined functions and SQL operators). In another embodiment, the functionality required on the database server can be implemented in the DBMS server software.

Another aspect of the invention comprises adjustable query-based encryption. Some encryption schemes leak more information than others about the data to the DBMS server, but are required to process certain queries. To avoid revealing all possible encryptions of data to the DBMS a priori, exemplary embodiments of the system carefully adjust the SQL-aware encryption scheme for any given data item, depending on the queries observed at run-time. To implement these adjustments efficiently, the system uses onions of encryption, which are a novel way to compactly store multiple ciphertexts within each other in the database and avoid expensive re-encryptions. Onions of encryption using layered encryption are particularly useful if the queries are not known in advance of run-time. However, if the queries are known in advance, for example by analyzing the application code using automated software or manually, it is possible to arrange for the queries to be transformed and the encryption scheme selected without decrypting onion layers at run-time.

A further aspect of the invention comprises chaining encryption keys to user passwords, so that each data item in the database can be decrypted only through a chain of keys rooted in the password of one of the users with access to that data. As a result, if the user is not logged into the application, and if the adversary does not know a user password, the adversary cannot decrypt the data for that user, even if the DBMS and the application server are fully compromised. To construct a chain of keys that captures the application's data privacy and sharing policy, exemplary embodiments of the system allow the developer to provide policy annotations over the application's SQL schema, specifying which users (or other principals, such as groups) have access to each data item.

In an exemplary actual implementation, a system supported operations over encrypted data for 99.5% of the 128,840 columns seen in a trace. Evaluation showed low overhead, reducing throughput by 14.5% for a web forum application, and by 26% for queries from TPC-C, compared to unmodified MySQL. In addition, chaining encryption keys to user passwords requires 11-13 unique schema annotations to enforce privacy policies on more than 20 sensitive fields and 2-7 lines of source code changes for three multi-user web applications, as described more fully below.

In threat 1, the system 100 guards against a curious DBA or other external attacker with full access to the data stored in the DBMS server 102. The attacker is assumed to be passive, i.e., wants to learn confidential data, but does not change queries issued by the application 104, query results, or the data in the DBMS 102. This threat includes DBMS software compromises, root access to DBMS machines, and even access to the RAM of physical machines. With the rise in database consolidation inside enterprise data centers, outsourcing of databases to public cloud computing infrastructures, and the use of third-party DBAs, this threat is increasingly important.

The system 100 aims to protect data confidentiality against this threat by executing SQL queries over encrypted data 120 on the DBMS server 102. The proxy 106 uses secret keys 130 to encrypt all data inserted or included in queries issued to the DBMS 102. The system allows the DBMS server 102 to perform query processing on encrypted data 120 as it would on an unencrypted database, by enabling it to compute certain functions over the data items based on encrypted data. For example, if the DBMS needs to perform a GROUP BY on column c, the DBMS server 102 determines which items in that column are equal to each other, but not the actual content of each item. Therefore, the proxy 106 needs to enable the DBMS server 102 to determine relationships among data necessary to process a query. By using SQL-aware encryption that adjusts dynamically to the queries presented, the system is careful about what relations it reveals between tuples to the server. For instance, if the DBMS needs to perform only a GROUP BY on a column c, the DBMS server 102 should not know the order of the items in column c, nor should it know any other information about other columns. If the DBMS is required to perform an ORDER BY, or to find the MAX or MIN, the system reveals the order of items in that column, but not otherwise.

The inventive system 100 provides confidentiality for data content and for names of columns and tables; the system does not hide the overall table structure, the number of rows, the types of columns, or the approximate size of data in bytes. The system does reveal to the DBMS server 102 relationships among data items that correspond to the classes of computation that queries perform on the database, such as comparing items for equality, sorting, or performing word search. In one embodiment, the granularity at which the system allows the DBMS to perform a class of computations is an entire column (or a group of joined columns, for joins), which means that even if a query requires equality checks for a few rows, executing that query on the server would require revealing that class of computation for an entire column. An alternative embodiment could use a different granularity such as individual rows.

In exemplary embodiments of the invention, the system provides a number of properties. For example, sensitive data is never available in plaintext at the DBMS server 102. The information revealed to the DBMS server 102 depends on the classes of computation required by the application's queries, subject to constraints specified by the application developer in the schema, for example: 1) if the application 104 requests no relational predicate filtering on a column, nothing about the data content leaks (other than its size in bytes); b) if the application 104 requests equality checks on a column, the proxy 106 reveals which items repeat in that column (the histogram), but not the actual values, and c) if the application 104 requests order checks on a column, the proxy 106 reveals the order of the elements in the column.

Another property provides that the DBMS server 102 cannot compute the (encrypted) results for queries that involve computation classes not requested by the application 104.

Threat 2 is now described in further detail where the application server 104, proxy 106, and DBMS server 102 infrastructures may be compromised arbitrarily. The approach in threat 1 is insufficient because an adversary can now get access to the keys used to encrypt the entire database. To address threat 2, the system encrypts different data items (e.g., data belonging to different users) with different keys. To determine the key that should be used for each data item, developers annotate the application's database schema to express finer-grained confidentiality policies.

A curious DBA still cannot obtain private data by snooping on the DBMS server (threat 1), and in addition, an adversary who compromises the application server or the proxy can now decrypt only data of currently logged-in users (whose keys are stored in the proxy). Data of currently inactive users would be encrypted with keys not available to the adversary, and would remain confidential. In this configuration, the system provides strong guarantees in the face of arbitrary server-side compromises, including those that gain root access to the application or the proxy. The system leaks at most the data of currently active users for the duration of the compromise, even if the proxy behaves in a Byzantine fashion. By "duration of a compromise", we mean the interval from the start of the compromise until any trace of the compromise has been erased from the system. For a read SQL injection attack, the duration of the compromise spans the attacker's SQL queries. In the above example of an adversary changing the email address of a user in the database, we consider the system compromised for as long as the attacker's email address persists in the database.

As noted above, the system executes SQL queries over encrypted data. For Threat 1, the DBMS machines and administrators are not trusted, but the application and the proxy are trusted. The system enables the DBMS server to execute SQL queries on encrypted data almost as if it were executing the same queries on plaintext data so that existing DBMSes do not need to be changed. The DBMS query plan for an encrypted query is typically the same as for the original query, except that the operators comprising the query, such as selections, projections, joins, aggregates, and orderings, are performed on ciphertexts, and use modified operators in some cases. The proxy stores a secret master key MK, the database schema, and the current encryption layers of all columns. The DBMS server sees an anonymized schema (in which table and column names are replaced by opaque identifiers), encrypted user data, and some auxiliary tables. The system also equips the server with specific user-defined functions (UDFs) that enable the server to compute on ciphertexts for certain operations.

In general, processing a query in the embodiment involving a database proxy involves four steps:

1. The application issues a query, which the proxy intercepts and rewrites: it anonymizes each table and column name, and, using the master key MK, encrypts each constant in the query with an encryption scheme best suited for the desired operation.

2. The proxy checks if the DBMS server should be given keys to adjust encryption layers before executing the query, and if so, issues an UPDATE query at the DBMS server that invokes a UDF to adjust the encryption layer of the appropriate columns.

3. The proxy forwards the encrypted query to the DBMS server, which executes it using standard SQL (occasionally invoking UDFs for some operations such as aggregation or keyword search).

4. The DBMS server returns the (encrypted) query result, which the proxy decrypts and returns to the application.

Exemplary embodiments of the invention can utilize various encryption types including a number of existing cryptosystems, scheme optimizations, and a novel cryptographic primitive for joins. For each encryption type, we explain the security property that the system requires from it, its functionality, and how it is implemented.

Random (RND) provides maximum security: indistinguishability under an adaptive chosen-plaintext attack (IND-CPA); the scheme is probabilistic, meaning that two equal values are mapped to different ciphertexts with overwhelming probability. On the other hand, RND does not allow any computation to be performed efficiently on the ciphertext. An efficient construction of RND is to use a block cipher like AES or Blowfish in CBC mode together with a random initialization vector (IV). (In one embodiment, AES is primarily used, except for integer values, where Blowfish is used for its 64-bit block size because the 128-bit block size of AES would cause the ciphertext to be significantly longer). Since, in this threat model, the system assumes the server does not change results, the system does not require a stronger IND-CCA2 construction (which would be secure under a chosen-ciphertext attack). However, it would be straightforward to use an IND-CCA2—secure implementation of RND instead, such as a block cipher in UFE mode, if needed.

Deterministic (DET) encryption has a slightly weaker guarantee, yet it still provides strong security: it leaks only which encrypted values correspond to the same data value, by deterministically generating the same ciphertext for the same plaintext. This encryption layer allows the server to perform equality checks, which means it can perform selects with equality predicates, equality joins, GROUP BY, COUNT, DISTINCT, etc. In cryptographic terms, DET should be a pseudo-random permutation (PRP). For 64-bit and 128-bit values, we use a block cipher with a matching block size (Blowfish and AES respectively); we make the usual assumption that the AES and Blowfish block ciphers are PRPs. Smaller values could be padded out to 64 bits or encrypted using the FFX mode, but for data that is longer than a single 128-bit AES block, the standard CBC mode of operation leaks prefix equality (e.g., if two data items have an identical prefix that is at least 128 bits long). To avoid this issue, one can use AES with a variant of the CMC mode, which can be approximately thought of as one round of CBC, followed by another round of CBC with the blocks in the reverse order. Since the goal of DET is to reveal equality, we use a zero IV (or "tweak") for our AES-CMC implementation of DET.

Order-preserving encryption (OPE) allows order relations between data items to be established based on their encrypted values, without revealing the data itself. If $x<y$, then $OPEK(x) < OPEK(y)$, for any secret key K. Therefore, if a column is encrypted with OPE, the server can perform range queries when given encrypted constants $OPEK(c1)$ and $OPEK(c2)$ corresponding to the range $[c1,c2]$. The server can also perform ORDER BY, MIN, MAX, SORT, etc. OPE is a weaker encryption scheme than DET because it reveals order. Thus, the proxy will only reveal OPE-encrypted columns to the server if users request order queries on those columns. OPE has provable security guarantees: the encryption is equivalent to a random mapping that preserves order.

Homomorphic encryption (HOM) is a secure probabilistic encryption scheme (IND-CPA secure), allowing the server to perform computations on encrypted data with the final result decrypted at the proxy. While fully homomorphic encryption may be prohibitively slow, homomorphic encryption for specific operations is efficient. To support summation, in one embodiment a Paillier cryptosystem was implemented. With Paillier, multiplying the encryptions of two values results in an encryption of the sum of the values, i.e., $HOM_K(x) \cdot HOM_K(y) = HOM_K(x+y)$, where the multiplication is performed modulo some public-key value. To compute SUM aggregates, the proxy replaces SUM with calls to a UDF that performs Paillier multiplication on a column encrypted with HOM. HOM encryption can also be used for computing averages by having the DBMS server return the sum and the count separately, and for incrementing values (e.g., SET id=id+1), described below. With HOM, the ciphertext is 2048 bits. In theory, it should be possible to pack multiple values from a single row into one HOM ciphertext for that row, which would result in an amortized space overhead of 2× (e.g., a 32-bit value occupies 64 bits) for a table with many HOM-encrypted columns.

In another aspect of the invention, a separate encryption scheme allows equality joins between two columns, because we use different keys for DET to prevent cross-column correlations. JOIN also supports all operations allowed by DET, and also enables the server to determine repeating values between two columns. OPE-JOIN enables joins by order relations. An inventive cryptographic scheme for JOIN is provided, which is described below.

Word search (SEARCH) is used to perform searches on encrypted text to support operations such as MySQL's LIKE operator. In one embodiment, a cryptographic protocol taught by D. X. Song, D. Wagner, and A. Perrig, "Practical techniques for searches on encrypted data," Proceedings of the 21st IEEE Symposium on Security and Privacy, Oakland, Calif., May 2000, is incorporated herein by reference is used. The technique from Song et al. allows the proxy to encrypt each word of a text and later to encrypt a word such that the server can discover matches of the encrypted word in the encrypted text. This protocol was used in a different way for better security guarantees. More particularly, for each column needing SEARCH, one can split the text into keywords using standard delimiters (or using a special keyword extraction function specified by the schema developer). We then remove repetitions in these words, randomly permute the positions of the words, and then encrypt each of the words using Song et al.'s scheme, padding each word to the same size.

SEARCH is nearly as secure as RND: the encryption does not reveal to the DBMS server whether a certain word repeats in multiple rows if the word has not yet been searched for, but it leaks the number of keywords encrypted with SEARCH; an adversary may be able to estimate the number of distinct or duplicate words in a text (e.g., by comparing the size of the SEARCH and RND ciphertexts for the same data).

When the user performs a query such as SELECT*FROM messages WHERE msg LIKE "% alice %", the proxy gives the DBMS server a token, which is an encryption of "alice." The server cannot decrypt the token to figure out the underlying word. Using a user-defined function, the DBMS server checks if any of the word encryptions in any message match the token. In the inventive approach, all the server learns from searching is whether a token matched a message or not, and not where and how many times in the message it did. The server would learn the same information when returning the result set to the users, so the overall search scheme reveals the minimum amount of additional information needed to return the result.

It should be noted that, when using the modified Song scheme, the system only allows full-word keyword searches for text search and it cannot support arbitrary regular expressions. For applications that require searching for multiple adjacent words, the system allows the application developer to provide a new function, denoted tokenize, that splits any message into the keywords the programmer desires to be located during a search, even though this is not the default. Most uses of LIKE can be supported by SEARCH with such schema annotations. Of course, one can still combine multiple LIKE operators with AND and OR to check whether multiple independent words are in the text.

In an exemplary embodiment, the system includes adjustable query-based encryption, which dynamically adjusts the layer of encryption on the DBMS server. It is desirable to use the most secure encryption schemes that enable running the requested queries. For example, if the application issues no queries that compare data items in a column, or that sort a column, the column should be encrypted with RND. For columns that require equality checks but not inequality checks, DET suffices. However, the query set is not always known in advance. Thus, an adaptive scheme that dynamically adjusts encryption strategies is desired. In one embodiment, each data item is encrypted in one or more onions: that is, each value is dressed in layers of increasingly stronger encryption, as illustrated in FIGS. 2 and 3.

A value encrypted using an onion of encryption is the result of a sequential application of encryption schemes: a message to be encrypted is first encrypted with the first encryption scheme in the sequence, then the resulting encryption is itself encrypted with the second encryption, and so forth up to the last encryption scheme in the sequence. The sequence of encryption schemes in an onion have the property that the top-most encryption scheme is the most secure, and the functionality of the encryption schemes increases strictly with encryption layers closer to the plaintext.

Figures 3, 3A:
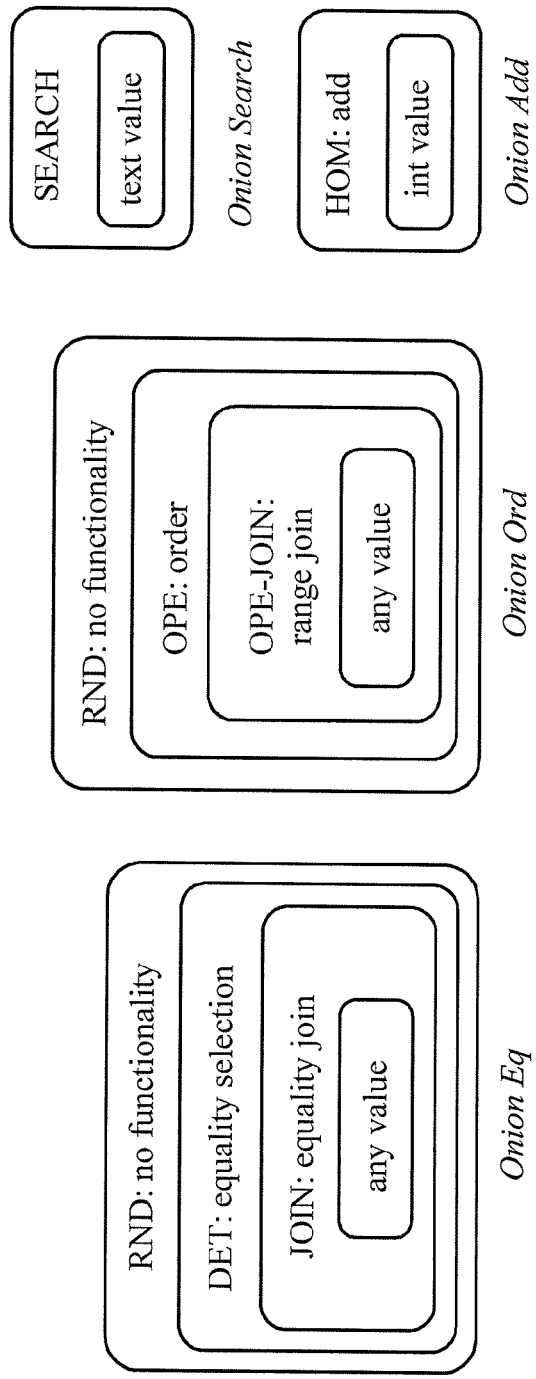
FIG. 3 is a schematic representation of exemplary layers of encryption and functionality.
FIG. 3A is a tabular representation of an exemplary data layout.

FIG. 3 shows an exemplary representation of onion encryption layers and the classes of computation they allow. Onion names stand for the operations they allow at some of their layers (Equality, Order, Search, and Addition). In practice, some onions or onion layers may be omitted, depending on column types or schema annotations provided by application developers. DET and JOIN are often merged into a single onion layer, since JOIN is a concatenation of DET and JOIN-ADJ. A random IV for RND, shared by the RND layers in Eq and Ord, is also stored for each data item.

FIG. 3A shows an exemplary data layout at the server. When the application creates the table shown on the left, the table created at the DBMS server is the one shown on the right. Ciphertexts shown are not full-length.

Each layer of each onion enables certain kinds of functionality as explained above. For example, outermost onion layers, such as RND and HOM, provide maximum security, whereas inner layers such as OPE provide more functionality. Multiple onions are needed in practice, both because the computations supported by different encryption schemes are not always strictly ordered, and because of performance considerations (size of ciphertext and encryption time for nested onion layers). Depending on the type of the data (and any annotations provided by the application developer on the database schema, as discussed below, the system may not maintain all onions for each column. For instance, the Search onion does not make sense for integers, and the Add onion does not make sense for strings. For each layer of each onion, the proxy 106 (FIG. 1) uses the same key for encrypting values in the same column, and different keys across tables, columns, onions, and onion layers. Using the same key for all values in a column allows the proxy 106 to perform operations on a column without having to compute separate keys for each row that will be manipulated. Finer-grained encryption keys can be used to reduce the potential amount of data disclosure in case of an application or proxy server compromise. Using different keys across columns prevents the server from learning any additional relations. All of these keys are derived from the master key MK. For example, for table t, column c, onion o, and encryption layer 1, the proxy uses the key $$K_{t,c,o,l}=\text{PRP}_{MK}(\text{table } t, \text{column } c, \text{onion } o, \text{layer } l), \quad (1)$$

where PRP is a pseudorandom permutation (e.g., AES).

Each onion starts out encrypted with the most secure encryption scheme (RND for onions Eq and Ord, HOM for onion Add, and SEARCH for onion Search). As the proxy receives SQL queries from the application, it determines whether layers of encryption need to be removed. Given a predicate P on column c needed to execute a query on the server, the proxy first establishes what onion layer is needed to compute P on c. If the encryption of c is not already at an onion layer that allows P, the proxy strips off the onion layers to allow P on c, by sending the corresponding onion key to the server. The proxy never decrypts the data past the least-secure encryption onion layer (or past some other threshold layer, if specified by the application developer in the schema).

In one embodiment, the system implements onion layer decryption using UDFs running on the DBMS server. For example, in FIG. 3, to decrypt onion Ord of column 2 in table 1 to layer OPE, the proxy issues the following query to the server using the DECRYPT_RND UDF:

UPDATE Table 1 SET

C2-Ord=DECRYPT_RND(K, C2-Ord, C2-IV), where K is the appropriate key computed from Equation (1). At the same time, the proxy updates its own internal state to remember that column C2-Ord in Table 1 is now at layer OPE in the DBMS. Each column decryption should be included in a transaction to avoid consistency problems with clients accessing columns being adjusted.

Note that onion decryption is performed entirely by the DBMS server. In the steady state, no server-side decryptions are needed, because onion decryption happens only when a new class of computation is requested on a column. For example, after an equality check is requested on a column and the server brings the column to layer DET, the column remains in that state, and future queries with equality checks require no decryption. This property explains the relatively modest overhead in the steady state: the server mostly performs typical SQL processing.

Once the onion layers in the DBMS are at the layer necessary to execute a query, the proxy transforms the query to operate on these onions. In particular, the proxy replaces column names in a query with corresponding onion names, based on the class of computation performed on that column. For example, for the schema shown in FIG. 3A, a reference to the Name column for an equality comparison will be replaced with a reference to the C2-Eq column.

The proxy also replaces each constant in the query with a corresponding onion encryption of that constant, based on the computation in which it is used. For instance, if a query contains WHERE Name='Alice', the proxy encrypts 'Alice' by successively applying all encryption layers corresponding to onion Eq that have not yet been removed from C2-Eq.

Also, the server replaces certain operators with UDF-based counterparts. For instance, the SUM aggregate operator and the + column-addition operator are replaced with an invocation of a UDF that performs HOM addition of ciphertexts. Equality and order operators (such as = and <) do not need such replacement and can be applied directly to the DET and OPE ciphertexts. Once the proxy has transformed the query, it sends the query to the DBMS server, receives query results (encrypted data), decrypts the results using the corresponding onion keys, and sends the decrypted result to the application.

To understand query execution over ciphertexts, consider the example schema shown in FIG. 3A. Initially, each column in the table is dressed in all onions of encryption, with RND, HOM, and SEARCH as outermost layers, as shown in FIG. 3. At this point, the server can learn nothing about the data other than the number of columns, rows, and data size. To illustrate when onion layers are removed, consider the query:

SELECT ID FROM Employees WHERE Name='Alice',
which requires lowering the encryption of Name to layer DET. To execute this query, the proxy first issues the query UPDATE Table 1 SET C2-Eq=DECRYPT_RND ($K_{T1,C2,Eq,RND}$, C2-Eq, C2-IV),
where column C2 corresponds to Name. The proxy then issues SELECT C1-Eq, C1-IV FROM Table 1 WHERE C2-Eq=x7 . . . d, where column C1 corresponds to ID, and where x7 . . . d is the Eq onion encryption of "Alice" with keys $K_{T1,C2,Eq,JOIN}$ and $K_{T1,C2,Eq,DET}$ (see FIGS. 3 and 3A). Note that the proxy requests the random IV from column C1-IV in order to decrypt the RND ciphertext from C1-Eq. Finally, the proxy decrypts the results from the server using keys $K_{T1,C1,Eq,RND}$, $K_{T1,C1,Eq,DET}$, and $K_{T1,C1,Eq,JOIN}$, obtains the result 23, and returns it to the application.

If the next query is SELECT COUNT(*) FROM Employees WHERE Name='Bob', no server-side decryptions are necessary, and the proxy directly issues the query SELECT COUNT(*) FROM Table 1 WHERE C2-Eq=xbb . . . 4a, where xbb . . . 4a is the Eq onion encryption of "Bob" using $K_{T1,C2,Eq,JOIN}$ and $K_{T1,C2,Eq,DET}$.

For write query execution, to support INSERT, DELETE, and UPDATE queries, the proxy applies the same processing to the predicates (i.e., the WHERE clause) as for read queries. DELETE queries require no additional processing. For all INSERT and UPDATE queries that set the value of a column to a constant, the proxy encrypts each inserted column's value with each onion layer that has not yet been stripped off in that column.

The remaining case is an UPDATE that sets a column value based on an existing column value, such as salary=salary+1. Such an update would have to be performed using HOM, to handle additions. However, in doing so, the values in the OPE and DET onions would become stale. In fact, any hypothetical encryption scheme that simultaneously allows addition and direct comparison on the ciphertext is insecure: if a malicious server can compute the order of the items, and can increment the value by one, the server can repeatedly add one to each field homomorphically until it becomes equal to some other value in the same column. This would allow the server to compute the difference between any two values in the database, which is almost equivalent to knowing their values.

There are two approaches to allow updates based on existing column values. If a column is incremented and then only projected (no comparisons are performed on it), the solution is simple: when a query requests the value of this field, the proxy should request the HOM ciphertext from the Add onion, instead of ciphertexts from other onions, because the HOM value is up-to-date. For instance, this approach applies to increment queries in TPC-C. If a column is used in comparisons after it is incremented, the solution is to replace the update query with two queries: a SELECT of the old values to be updated, which the proxy increments and encrypts accordingly, followed by an UPDATE setting the new values. This strategy works well for updates that affect a small number of rows.

Other DBMS mechanisms, such as transactions and indexing, work the same way over encrypted data as they do over plaintext, with no modifications. For transactions, the proxy passes along any BEGIN, COMMIT, and ABORT queries to the DBMS. Since many SQL operators behave differently on NULLs than on non-NULL values, the system exposes NULL values to the DBMS without encryption.

The DBMS builds indexes for encrypted data in the same way as for plaintext. Currently, if the application requests an index on a column, the proxy asks the DBMS server to build indexes on that column's DET, JOIN, OPE, or OPE-JOIN onion layers (if they are exposed), but not for RND, HOM, or SEARCH.

In one particular embodiment, there are two kinds of joins are supported: equi-joins, in which the join predicate is based on equality, and range joins, which involve order checks. To perform an equi-join of two encrypted columns, the columns should be encrypted with the same key so that the server can see matching values between the two columns. At the same time, to provide better privacy, the DBMS server should not be able to join columns for which the application did not request a join, so columns that are never joined should not be encrypted with the same keys.

If the queries that can be issued, or the pairs of columns that can be joined, are known a priori, equi-join is easy to support: the system can use the DET encryption scheme with the same key for each group of columns that are joined together. One challenging case is when the proxy does not know the set of columns to be joined a priori, and hence does not know which columns should be encrypted with matching keys.

A further aspect of the invention provides a novel cryptographic primitive, JOIN-ADJ (adjustable join), which allows the DBMS server to adjust the key of each column at runtime. Intuitively, JOIN-ADJ can be thought of as a keyed cryptographic hash with the additional property that hashes can be adjusted to change their key without access to the plaintext. JOIN-ADJ is a deterministic function of its input, which means that if two plaintexts are equal, the corresponding JOIN-ADJ values are also equal. JOIN-ADJ is collision-resistant, and has a sufficiently long output length (192 bits) to allow us to assume that collisions never happen in practice. JOIN-ADJ is non-invertible, so one defines the JOIN encryption scheme as JOIN(v)=JON-ADJ(v)∥DET(v),
where ∥ denotes concatenation. This construction allows the proxy to decrypt a JOIN(v) column to obtain v by decrypting the DET component, and allows the DBMS server to check two JOIN values for equality by comparing the JOIN-ADJ components.

Each column is initially encrypted at the JOIN layer using a different key, thus preventing any joins between columns. When a query requests a join, the proxy gives the DBMS server an onion key to adjust the JOIN-ADJ values in one of the two columns, so that it matches the JOIN-ADJ key of the other column (denoted the join-base column). After the adjustment, the columns share the same JOIN-ADJ key, allowing the DBMS server to join them for equality. The DET components of JOIN remain encrypted with different keys.

Note that the inventive adjustable join is transitive: if the user joins columns A and B and then joins columns B and C, the server can join A and C. However, the server cannot join columns in different "transitivity groups". For instance, if columns D and E were joined together, the DBMS server would not be able to join columns A and D on its own.

After an initial join query, the JOIN-ADJ values remain transformed with the same key, so no re-adjustments are needed for subsequent join queries between the same two columns. One exception is if the application issues another query, joining one of the adjusted columns with a third column, which causes the proxy to readjust the column to another join-base. To avoid oscillations and to converge to a state where all columns in a transitivity group share the same join-base, the system chooses the first column in lexicographic order on table and column name as the join-base. For n columns, the overall maximum number of join transitions is n(n−1)/2.

For range joins, a similar dynamic re-adjustment scheme is difficult to construct due to lack of structure in OPE schemes. In an exemplary embodiment, the system requires that pairs of columns that will be involved in such joins be declared by the application ahead of time, so that matching keys are used for layer OPE-JOIN of those columns; otherwise, the same key will be used for all columns at layer OPE-JOIN.

In exemplary embodiments of the invention, elliptic-curve cryptography (ECC) is used.

$$\text{JOIN-ADJ}_{K(v)} \text{ is computed as JOIN-ADJ}_K(v) := P^{K\,PRF}{}_{K0}{}^{(v)}, \quad (2)$$

where K is the initial key for that table, column, onion, and layer, P is a point on an elliptic curve (being a public parameter), and $PRF_{K0}$ is a pseudo-random function mapping values to a pseudorandom number, such as $AES_{K0}(SHA(v))$, with K0 being a key that is the same for all columns and derived from MK. The "exponentiation" is in fact repeated geometric addition of elliptic curve points; it is considerably faster than RSA exponentiation.

When a query joins columns c and c', each having keys K and K' at the join layer, the proxy computes ΔK=K/K' (in an appropriate group) and sends it to the server. Then, given $JOIN\text{-}ADJ_{K'}(v)$ (the JOIN-ADJ values from column c') and ΔK, the DBMS server uses a UDF to adjust the key in c' by computing:

$$(JOIN\text{-}ADJ_{K'}(v))^{\Delta K} = P^{K'\,PRF}K0^{(v)(K/K')}$$

$$= P^{K\,PRF}K0^{(v)} = JOIN\text{-}ADJ_K(v).$$

Now columns c and c' share the same JOIN-ADJ key, and the DBMS server can perform an equi-join on c and c' by taking the JOIN-ADJ component of the JOIN onion ciphertext.

At a high level, the security of this scheme is that the server cannot infer join relations among groups of columns that were not requested by legitimate join queries, and that the scheme does not reveal the plaintext.

Although in an exemplary embodiment the inventive system can operate with an unmodified and unannotated schema, as described above, its security and performance can be improved through several optional optimizations, as described below.

Application developers can specify the lowest onion encryption layer that may be revealed to the server for a specific column. In this way, the developer can ensure that the proxy will not execute queries exposing sensitive relations to the server. For example, the developer can specify that credit card numbers should always remain at RND or DET.

Although the system can evaluate a number of predicates on the server, evaluating them in the proxy can improve security by not revealing additional information to the server. One common use case is a SELECT query that sorts on one of the selected columns, without a LIMIT on the number of returned columns. Since the proxy receives the entire result set from the server, sorting these results in the proxy does not require a significant amount of computation, and does not increase the bandwidth requirements. Doing so avoids revealing the OPE encryption of that column to the server.

In one particular embodiment, the system provides a training mode that allows a developer to provide a trace of queries and get the resulting onion encryption layers for each field, along with a warning in case some query is not supported. The developer can then examine the resulting encryption levels to understand what each encryption scheme leaks. If some onion level is too low for a sensitive field, it can be arranged to have the query processed in the proxy (as described above), or to process the data in some other fashion, such as by using a local instance of a DBMS.

In cases when an application performs infrequent queries requiring a low onion layer (e.g., OPE), the system can be extended to re-encrypt onions back to a higher layer after the infrequent query finishes executing. This approach reduces leakage to attacks happening in the time window when the data is at the higher onion layer.

In some embodiments, performance optimizations can be achieved with developer annotations. By default, the system encrypts all fields and creates all applicable onions for each data item based on its type. If many columns are not sensitive, the developer can instead provide explicit annotations indicating the sensitive fields, and leave the remaining fields in plaintext.

If the developer knows some of the queries ahead of time, as is the case for many web applications, the developer can use the training mode described above to adjust onions to the correct layer a priori, avoiding the overhead of runtime onion adjustments. If the developer provides the exact query set, or annotations that certain functionality is not needed on some columns, the system can also discard onions that are not needed (e.g., discard the Ord onion for columns that are not used in range queries, or discard the Search onion for columns where keyword search is not performed), discard onion layers that are not needed (e.g., the adjustable JOIN layer, if joins are known a priori), or discard the random IV needed for RND for some columns.

The proxy spends a significant amount of time encrypting values used in queries with OPE and HOM. To reduce this cost, in one embodiment the proxy pre-computes (for HOM) and caches (for OPE) encryptions of frequently used constants under different keys. Since HOM is probabilistic, ciphertexts cannot be reused. Therefore, in addition, the proxy pre-computes HOM's Paillier r'' randomness values for future encryptions of any data. This optimization reduces the amount of CPU time spent by the proxy on OPE encryption, and assuming the proxy is occasionally idle to perform HOM pre-computation, it removes HOM encryption from the critical path.

As described above, user defined functions (UDFs) are used to enable the DBMS server to compute certain functions on encrypted data or to adjust the encryption scheme. UDFs are a standard component of the interface of common DBMSes. In one embodiment, the following user defined functions have been defined:

DECRYPT_RND(key, ciphertext, salt)

DECRYPT_RND receives as inputs the key for a certain RND layer of a database column, an encrypted value from the database denoted 'ciphertext', and some salt associated to the ciphertext also from the database. It applies the decryption algorithm of the RND scheme and returns the result.

DECRYPT_DET(key, ciphertext)

DECRYPT_DET receives as inputs the key for the DET layer of a database column and an encrypted value from the database called 'ciphertext'. It decrypts the ciphertext using the decryption algorithm of the DET scheme and returns the result.

DECRYPT_OPE(key, ciphertext)

DECRYPT_OPE receives as inputs the key for a certain onion layer and an encrypted value from the database called 'ciphertext'. It decrypts the ciphertext using the decryption algorithm of the OPE scheme and returns the result.

SEARCH(token, ciphertext)

SEARCH receives as inputs a token that corresponds to an encrypted keyword based on the modified Song scheme and an encrypted text from the database, denoted 'ciphertext'. Using the modified Song algorithm, SEARCH returns true if the keyword to which token corresponds exists in the unencrypted text, or false otherwise.

SUM(ciphertext, publickey)

SUM is an aggregate user-defined function. It receives as inputs an encrypted value, 'ciphertext', and a public key that corresponds to the HOM scheme described above. SUM maintains an internal encrypted aggregate value and adds homomorphically the ciphertext to this aggregate using the public key. The SUM UDF may be called on a few rows in a database and it returns the overall encrypted aggregate result over these rows.

INCREMENT(ciphertext, encrypted_constant, publickey)

INCREMENT receives as inputs a ciphertext from the database, an encrypted constant, and a public key corresponding to the HOM scheme described above. INCREMENT homomorphically adds encrypted_constant to ciphertext, effectively incrementing the value ciphertext corresponds to by the constant in encrypted_constant. It returns the newly incremented value.

The threat model can be extended to the case when the application infrastructure and proxy are also untrusted (threat 2). This model is especially relevant for a multi-user web site running a web and application server. To understand both the problems faced by a multiuser web application and solutions provided by exemplary embodiments of the invention, consider phpBB, a popular online web forum. In phpBB, each user has an account and a password, belongs to certain groups, and can send private messages to other users. Depending on their groups' permissions, users can read entire forums, only forum names, or not be able to read a forum at all. There are several confidentiality guarantees that would be useful in phpBB. For example, we would like to ensure that a private message sent from one user to another is not visible to anyone else; that posts in a forum are accessible only to users in a group with access to that forum; and that the name of a forum is shown only to users belonging to a group that's allowed to view it. The inventive system provides these guarantees in the face of arbitrary compromises, thereby limiting the damage caused by a compromise.

Achieving these guarantees requires addressing first and second challenges. First, the system captures the application's access control policy for shared data at the level of SQL queries. To do this, the system requires developers to annotate their database schema to specify principals and the data that each principal has access to, as described below.

A second challenge is to reduce the amount of information that an adversary can gain by compromising the system. The inventive system limits the leakage resulting from a compromised application or proxy server to just the data accessible to users who were logged in during the compromise. In particular, the attacker cannot access the data of users that were not logged in during the compromise. Leaking the data of active users in case of a compromise is unavoidable: given the impracticality of arbitrary computation on encrypted data, some data for active users must be decrypted by the application.

In exemplary embodiments of the invention, each user has a key (e.g., her application-level password) that provide access to the user's data. The system encrypts different data items with different keys, and enforces the access control policy using chains of keys starting from user passwords and ending in the encryption keys of SQL data items, as described below. When a user logs in, the user provides a password to the proxy (via the application). The proxy uses this password to derive onion keys to process queries on encrypted data, as described above, and to decrypt the results. The proxy can decrypt only the data that the user has access to, based on the access control policy. The proxy gives the decrypted data to the application, which can now compute on it. When the user logs out, the proxy deletes the user's key.

To express the data privacy policy of a database-backed application at the level of SQL queries, the application developer can annotate the schema of a database by specifying, for any subset of data items, which principal has access to it. A principal is an entity, such as a user or a group, over which it is natural to specify an access policy. Each SQL query involving an annotated data item requires the privilege of the corresponding principal.

Exemplary embodiments of the invention define its own notion of principals instead of using existing DBMS principals for two reasons: first, many applications do not map application-level users to DBMS principals in a sufficiently fine-grained manner, and second, the system requires explicit delegation of privileges between principals that is difficult to extract in an automated way from an access control list specification.

An application developer annotates the schema using the three steps described below and illustrated in FIG. 4. In the examples, italics indicate table and column names, and bold text indicates annotations added for the inventive system.

Step 1. The developer defines the principal types (using PRINCTYPE) used in her application, such as users, groups, or messages. A principal is an instance of a principal type, e.g., principal 5 of type user. There are two classes of principals: external and internal. External principals correspond to end users who explicitly authenticate themselves to the application using a password. When a user logs into the application, the application must provide the user password to the proxy so that the user can get the privileges of her external principal. Privileges of other (internal) principals can be acquired only through delegation, as described in Step 3. When the user logs out, the application must inform the proxy, so that the proxy forgets the user's password as well as any keys derived from the user's password.

Step 2. The developer specifies which columns in her SQL schema contain sensitive data, along with the principals that should have access to that data, using the ENC FOR annotation. The system requires that for each private data item in a row, the name of the principal that should have access to that data be stored in another column in the same row. For example, in FIG. 4, the decryption of msgtext x37a21f is available only to principal 5 of type msg.

FIG. 4 shows part of phpBB's schema with annotations to secure private messages. Only the sender and receiver may see the private message. An attacker that gains complete access to phpBB and the DBMS can access private messages of only currently active users.

Step 3. Programmers can specify rules for how to delegate the privileges of one principal to other principals, using the known speaksfor relation, for example. In phpBB, for example, a user should also have the privileges of the groups the user belongs to. Since many applications store such information in tables, programmers can specify how to infer delegation rules from rows in an existing table. In particular, programmers can annotate a table T with (a x) SPEAKS_FOR (by). This annotation indicates that each row present in that table specifies that principal a of type x speaks for principal b of type y, meaning that a has access to all keys that b has access to. Here, x and y must always be fixed principal types. Principal b is always specified by the name of a column in table T. On the other hand, a can be either the name of another column in the same table, a constant, or T2.col, meaning all principals from column col of table T2. For example, in FIG. 4, principal "Bob" of type physical user speaks for principal 2 of type user, and in FIG. 6, all principals in the contactId column from table PCMember (of type contact) speak for the paperId principal of type review. Optionally, the programmer can specify a predicate, whose inputs are values in the same row, to specify a condition under which delegation should occur, such as excluding conflicts in FIG. 6. Additional examples of using annotations to secure applications are described below.

Each principal (i.e., each instance of each principal type) is associated with a secret, randomly chosen key. If principal B speaks for principal A (as a result of some SPEAKS_FOR annotation), then principal A's key is encrypted using principal B's key, and stored as a row in the special access keys table in the database. This allows principal B to gain access to principal A's key. For example, in FIG. 4, to give users 1 and 2 access to message 5, the key of msg 5 is encrypted with the key of user 1, and also separately encrypted with the key of user 2.

Each sensitive field is encrypted with the key of the principal in the ENC FOR annotation. The system encrypts the sensitive field with onions in the same way as for single-principal (described above), except that onion keys are derived from a principal's key as opposed to a global master key.

The key of each principal is a combination of a symmetric key and a public-private key pair. In the common case, the system uses the symmetric key of a principal to encrypt any data and other principals' keys accessible to this principal, with little CPU cost. However, this is not always possible, if some principal is not currently online. For example, in FIG. 4, suppose Bob sends message 5 to Alice, but Alice (user 1) is not online. This means that the system does not have access to user 1's key, so it will not be able to encrypt message 5's key with user 1's symmetric key. In this case, the system looks up the public key of the principal (i.e., user 1) in a second table, public keys, and encrypts message 5's key using user 1's public key. When user 1 logs in, user 1 will be able to use the secret key part of her key to decrypt the key for message 5 (and re-encrypt it under the symmetric key for future use).

For external principals (i.e., physical users), the system assigns a random key just as for any other principal. To give an external user access to the corresponding key on login, the system stores the key of each external principal in a third table, external keys, encrypted with the principal's password. This allows the system to obtain a user's key given the user's password, and also allows a user to change passwords without changing the key of the principal.

When a table with a SPEAKS_FOR relation is updated, the system updates the access keys table accordingly. To insert a new row into access keys for a new SPEAKS_FOR relation, the proxy must have access to the key of the principal whose privileges are being delegated. This means that an adversary that breaks into an application or proxy server cannot create new SPEAKS_FOR relations for principals that are not logged in, because neither the proxy nor the adversary have access to their keys. If a SPEAKS_FOR relation is removed, the system revokes access by removing the corresponding row from access keys.

When encrypting data in a query or decrypting data from a result, the system follows key chains starting from passwords of users logged in until it obtains the desired keys. As an optimization, when a user logs in, the system proxy loads the keys of some principals to which the user has access (in particular, those principal types that do not have too many principal instances—e.g., for groups the user is in, but not for messages the user received). Applications inform the system of users logging in or out by issuing INSERT and DELETE SQL queries to a special table cryptdb_active that has two columns, username and password. The proxy intercepts all queries for cryptdb_active, stores the passwords of logged-in users in memory, and never reveals them to the DBMS server.

The system guards the data of inactive users at the time of an attack. If a compromise occurs, the system provides a bound on the data leaked, allowing the administrators to not issue a blanket warning to all the users of the system. In this respect, the inventive system is different from known approaches to database security. However, some special users such as administrators with access to a large pool of data enable a larger compromise upon an attack. To avoid attacks happening when the administrator is logged in, the administrator should create a separate user account with restricted permissions when accessing the application as a regular user. Also, as good practice, an application should automatically log out users who have been inactive for some period of time.

Exemplary systems are now described for securing three existing multi-user web applications. For brevity, we show simplified schemas, omitting irrelevant fields and type specifiers. Overall, we find that once a programmer specifies the principals in the application's schema, and the delegation rules for them using SPEAKS_FOR, protecting additional sensitive fields just requires additional ENC FOR annotations.

FIG. 5 shows an annotated schema for securing access to posts in phpBB. A user has access to see the content of posts in a forum if any of the groups that the user is part of has such permissions, indicated by optionid 20 in the aclgroups table for the corresponding forumid and groupid. Similarly, optionid 14 enables users to see the forum's name.

As is well known, phpBB is a widely used open source forum with a rich set of access control settings. Users are organized in groups; both users and groups have a variety of access permissions that the application administrator can choose. Securing private messages between two users in phpBB was described above in conjunction with FIG. 4. A more detailed case is securing access to posts, as shown in FIG. 5. This example shows how to use predicates (e.g., IF optionid=...) to implement a conditional speaks-for relation on principals, and also how one column (forumid) can be used to represent multiple principals (of different type) with different privileges. It is understood that there are more ways to gain access to a post, but they are omitted for the sake of brevity.

HotCRP is a popular conference review application. A key policy for HotCRP is that PC members cannot see who reviewed their own (or conflicted) papers. FIG. 6 shows annotations for HotCRP's schema to enforce this policy. Reviews and the identity of reviewers providing the review will be available only to PC members (table PCMember includes PC chairs) who are not conflicted, and PC chairs cannot override this restriction.

The known HotCRP application cannot prevent a curious or careless PC chair from logging into the database server and seeing who wrote each review for a paper for which there is a conflict. As a result, conferences often set up a second server to review the chair's papers or use inconvenient out of band emails. With the inventive system, a PC chair cannot learn who wrote each review for a paper, even after breaking into the application or database, since the PC Chair does not have the decryption key. The reason is that the SQL predicate "NoConflict" checks if a PC member is conflicted with a paper and prevents the proxy from providing access to the PC chair in the key chain. It is assumed that the PC chair does not modify the application to log the passwords of other PC members to subvert the system.

The grad-apply application is a graduate admissions system used by MIT EECS, for example. The schema was annotated to allow an applicant's folder to be accessed only by the respective applicant and any faculty using (reviewers.reviewer_id reviewer), meaning all reviewers, SPEAKS_FOR (candidate_id candidate) in table candidates, and . . . SPEAKS_FOR (letter_id letter) in table letters. The applicant can see all of their folder data except for letters of recommendation. Overall, grad-apply has simple access control and therefore simple annotations.

Exemplary embodiments of the invention support most relational queries and aggregates on standard data types, such as integers and text/varchar types. Additional operations can be added by extending its existing onions, or adding new onions for specific data types (e.g., spatial and multi-dimensional range queries). Alternatively, in some cases, it may be possible to map complex unsupported operation to simpler ones (e.g., extracting the month out of an encrypted date is easier if the date's day, month, and year fields are encrypted separately). There are certain computations that may not be able to be supported on encrypted data. For example, it may not be possible to support both computation and comparison on the same column, such as WHERE salary>age*2+10. The system can process a part of this query, but it would also require some processing on the proxy. In the system, such a query should be (1) rewritten into a sub-query that selects a whole column, SELECT age*2+10 FROM . . . , computed using HOM, and (2) re-encrypted in the proxy, creating a new column (call it aux) on the DBMS server comprising the newly encrypted values. Finally, the original query with the predicate WHERE salary>aux should be run.

When chaining encryption keys to user passwords, the system cannot perform server-side computations on values encrypted for different principals, even if the application has the authority of all principals in question, because the ciphertexts are encrypted with different keys. For some computations, it may be practical for the proxy to perform the computation after decrypting the data, but for others (e.g., large-scale aggregates) this approach may be too expensive. A possible extension to support such queries may be to maintain multiple ciphertexts for such values, encrypted under different keys.

It is understood that a variety of exemplary implementations are possible for systems to provide confidentiality in accordance with exemplary embodiments of the invention. In one particular embodiment, the proxy comprises C++ library and a Lua module. The C++ library includes a query parser; a query encryptor/rewriter, which encrypts fields or includes UDFs in the query; and a result decryption module. To allow applications to transparently use the system, we used MySQL proxy and implemented a Lua module that passes queries and results to and from the C++ module. The inventive cryptographic protocols were implemented using NTL.

As noted above, the inventive system does not change the DBMS; we implement all server-side functionality with UDFs and server-side tables. As a consequence, the inventive system works on top of any SQL DBMS that supports UDFs and standard SQL. This feature of the system enables easier adoption of CryptDB in a variety of existing DBMSes and helps preserve the optimized performance of DBMSes.

Some information is now provided on four aspects of the inventive system: the difficulty of modifying an application to run on top of the system, the types of queries and applications the system is able to support, the level of security the system provides, and the performance impact of using the system. For this analysis, we use seven applications as well as a large trace of SQL queries.

We evaluate the effectiveness of our annotations and the needed application changes on the three applications described above (phpBB, HotCRP, and grad-apply), as well as on a TPC-C query mix (a standard workload in the database industry). We then analyze the functionality and security of CryptDB on three more applications, on TPC-C, and on a large trace of SQL queries. The additional three applications are OpenEMR, an electronic medical records application storing private medical data of patients; the web application of an MIT class (6.02), storing students' grades; and PHP-calendar, storing people's schedules. The large trace of SQL queries comes from a popular MySQL server at MIT, sql.mit.edu. This server is used primarily by web applications running on scripts.mit.edu, a shared web application hosting service operated by MIT's Student Information Processing Board (SIPB). In addition, this SQL server is used by a number of applications that run on other machines and use sql.mit.edu only to store their data. Our query trace spans about ten days, and includes approximately 126 million queries.

In FIG. 7, a number of databases, tables, and columns on the sql.mit.edu MySQL server, used for trace analysis, indicating the total size of the schema, and the part of the schema seen in queries during the trace period. FIG. 7 summarizes the schema statistics for sql.mit.edu; each database is likely to be a separate instance of some application.

Finally, we evaluate the overall performance of the system on the phpBB application and on a query mix from TPC-C, and perform a detailed analysis through microbenchmarks. In the six applications (not counting TPC-C), we only encrypt sensitive columns, according to a manual inspection. Some fields were clearly sensitive (e.g., grades, private message, medical information), but others were only marginally so (e.g., the time when a message was posted). There was no clear threshold between sensitive or not, but it was clear to us which fields were definitely sensitive. In the case of TPC-C, we encrypt all the columns in the database in single-principal mode so that we can study the performance and functionality of a fully encrypted DBMS. All fields are considered for encryption in the large query trace as well.

FIG. 8 summarizes the amount of programmer effort required to use the system in three multi-user web applications and in the single-principal TPC-C queries. The results show that, for multi-principal mode, the system required between 11 and 13 unique schema annotations (29 to 111 in total), and 2 to 7 lines of code changes to provide user passwords to the proxy, in order to secure sensitive information stored in the database. Part of the simplicity is because securing an additional column requires just one annotation in most cases. The single-principal TPC-C queries required no application annotations at all.

To evaluate what columns, operations, and queries the system can support, we analyzed the queries issued by six web applications, the TPC-C queries, and the SQL queries from sql.mit.edu. The results are shown in the left half of FIG. 9. The inventive system supports most queries; the number of columns in the "needs plaintext" column, which counts columns that cannot be processed in encrypted form, is small relative to the total number of columns. For PHP-calendar and OpenEMR, the system does not support queries on certain sensitive fields that perform string manipulation (e.g., substring and lowercase conversions) or date manipulation (e.g., obtaining the day, month, or year of an encrypted date). However, if these functions were precomputed with the result added as standalone columns (e.g., each of the three parts of a date were encrypted separately), the system would support these queries. The next two columns, "needs HOM" and "needs SEARCH", reflect the number of columns for which that encryption scheme is needed to process some queries. The numbers suggest that these encryption schemes are important; without these schemes, the system would be unable to support those queries.

Based on an analysis of the larger sql.mit.edu trace, we found that the system should be able to support operations over all but 1,094 of the 128,840 columns observed in the trace. The "in-proxy processing" shows analysis results where we assumed the proxy can perform some lightweight operations on the results returned from the DBMS server. Specifically, this included any operations that are not needed to compute the set of resulting rows or to aggregate rows (that is, expressions that do not appear in a WHERE, HAVING, or GROUP BY clause, or in an ORDER BY clause with a LIMIT, and are not aggregate operators). With in-proxy processing, the system should be able to process queries over encrypted data over all but 571 of the 128,840 columns, thus supporting 99.5% of the columns. Of those 571 columns, 222 use a bitwise operator in a WHERE clause or perform bitwise aggregation, such as the Gallery2 application, which uses a bitmask of permission fields and consults them in WHERE clauses. Rewriting the application to store the permissions in a different way would allow the system to support such operations. Another 205 columns perform string processing in the WHERE clause, such as comparing whether lowercase versions of two strings match. Storing a keyed hash of the lowercase version of each string for such columns, similar to the JOIN-ADJ scheme, could support case-insensitive equality checks for ciphertexts. 76 columns are involved in mathematical transformations in the WHERE clause, such as manipulating dates, times, scores, and geometric coordinates. 41 columns invoke the LIKE operator with a column reference for the pattern; this is typically used to check a particular value against a table storing a list of banned IP addresses, usernames, URLs, etc. Such a query can also be rewritten if the data items are sensitive.

To understand the amount of information that would be revealed to the adversary in practice, we examine the steady-state onion levels of different columns for a range of applications and queries.

FIG. 8 shows the number of annotations the programmer needs to add to secure sensitive fields, lines of code to be added to provide the passwords of users, and the number of sensitive fields that the system secures with these annotations, for three different applications. We count as one annotation each invocation of our three types of annotations and any SQL predicate used in a SPEAKS_FOR annotation. Since multiple fields in the same table are usually encrypted for the same principal (e.g., message subject and content), we also report unique annotations.

FIG. 9 shows the steady-state onion levels for database columns required by a range of applications and traces. "Needs plaintext" indicates that the system cannot execute the application's queries over encrypted data for that column. For the applications in the top group of rows, sensitive columns were determined manually, and only these columns were considered for encryption. For the bottom group of rows, all database columns were automatically considered for encryption. The rightmost column considers the application's most sensitive database columns, and reports the number of them that have MinEnc in HIGH.

To quantify the level of security, we define the MinEnc of a column to be the weakest onion encryption scheme exposed on any of the onions of a column when onions reach a steady state (i.e., after the application generates all query types, or after running the whole trace). We consider RND and HOM to be the strongest schemes, followed by SEARCH, followed by DET and JOIN, and finishing with the weakest scheme which is OPE. For example, if a column has onion Eq at RND, onion Ord at OPE and onion Add at HOM, the MinEnc of this column is OPE. The right side of FIG. 9 shows the MinEnc onion level for a range of applications and query traces. We see that most fields remain at RND, which is the most secure scheme. For example, OpenEMR has hundreds of sensitive fields describing the medical conditions and history of patients, but these fields are mostly just inserted and fetched, and are not used in any computation. A number of fields also remain at DET, typically to perform key lookups and joins. OPE, which leaks order, is used the least frequently, and mostly for fields that are marginally sensitive (e.g., timestamps and counts of messages). Thus, adjustable security of the system provides a significant improvement in confidentiality over revealing all encryption schemes to the server.

To analyze the security for specific columns that are particularly sensitive, we define a new security level, HIGH, which includes the RND and HOM encryption schemes, as well as DET for columns having no repetitions (in which case DET is logically equivalent to RND). These are highly secure encryption schemes leaking virtually nothing about the data. DET for columns with repeats and OPE are not part of HIGH as they reveal relations to the DBMS server. The rightmost column in FIG. 9 shows that most of the particularly sensitive columns (again, according to manual inspection) are at HIGH.

For the sql.mit.edu trace queries, approximately 6.6% of columns were at OPE even with in-proxy processing; other encrypted columns (93%) remain at DET or above. Out of the columns that were at OPE, 3.9% are used in an ORDER BY clause with a LIMIT, 3.7% are used in an inequality comparison in a WHERE clause, and 0.25% are used in a MIN or MAX aggregate operator (some of the columns are counted in more than one of these groups). It would be difficult to perform these computations in the proxy without substantially increasing the amount of data sent to it.

Although we could not examine the schemas of applications using sql.mit.edu to determine what fields are sensitive—mostly due to its large scale—we measured the same statistics as above for columns whose names are indicative of sensitive data. In particular, the last three rows of FIG. 9 show columns whose name contains the word "pass" (which are almost all some type of password), "content" (which are typically bulk data managed by an application), and "priv" (which are typically some type of private message). The system reveals much less information about these columns than an average column, almost all of them are typically, and almost all are at RND or DET. Finally, we empirically validated confidentiality guarantees by trying real attacks on phpBB that have been listed in the CVE database, including two SQL injection attacks (CVE-2009-3052 & CVE-2008-6314), bugs in permission checks (CVE-2010-1627 & CVE-2008-7143), and a bug in remote PHP file inclusion (CVE-2008-6377). We found that, for users not currently logged in, the answers returned from the DBMS were encrypted; even with root access to the application server, proxy, and DBMS, the answers were not decryptable.

Figure 10:
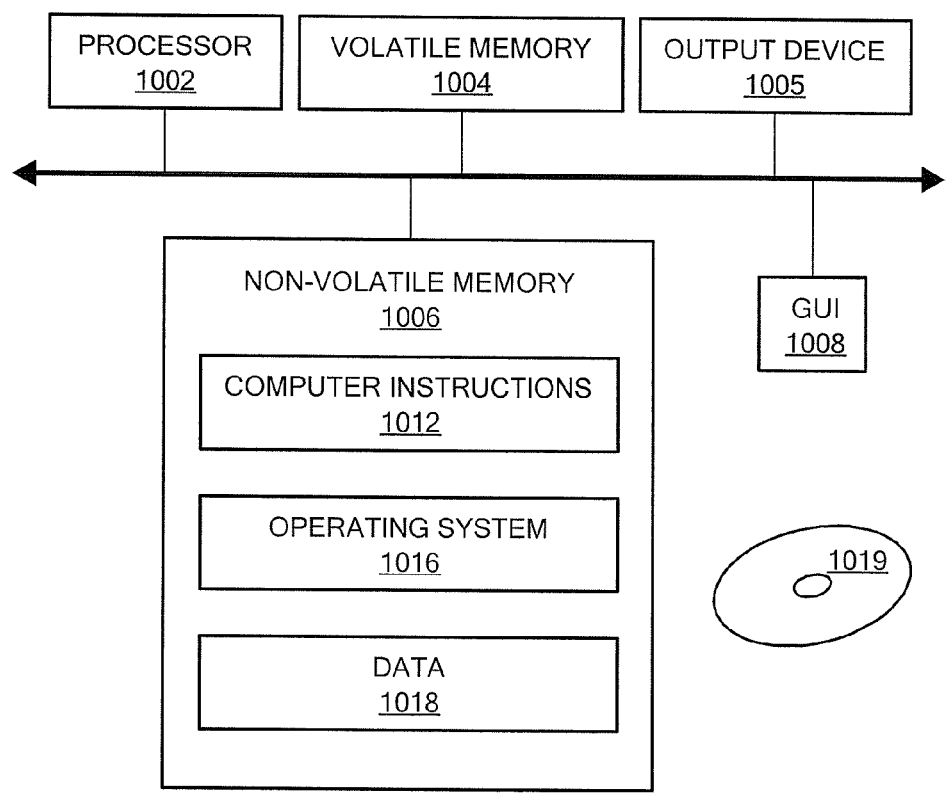
FIG. 10 is a schematic representation of an exemplary computer that can form a portion of exemplary embodiments of the invention.

Referring to FIG. 10, a computer includes a processor 1002, a volatile memory 1004, an output device 1005, a non-volatile memory 1006 (e.g., hard disk), and a graphical user interface (GUI) 1008 (e.g., a mouse, a keyboard, a display, for example). The non-volatile memory 1006 stores computer instructions 1012, an operating system 1016 and data 1018, for example. In one example, the computer instructions 1012 are executed by the processor 1002 out of volatile memory 1004 to perform all or part of the processing described above. An article 1019 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for processing database queries, comprising:
    encrypting a database in a database system using two or more encryption schemes, with each data item in the database encrypted using at least one of the two or more encryption schemes;
    selecting for each data item specified in an input query from an application, one of the encryption schemes;
    transforming the input query to an encrypted query using the selected encryption scheme for each data item specified in the query;
    determining the input query requests a join between a stored first column initially encrypted with a first key and a stored second column encrypted with a second key different from the first key;
    providing a token to the database system for adjusting an encryption of the first stored column to an encryption with the second key to match an encryption of the stored second column, wherein subsequent join queries between the stored first column and the stored second column can be executed without re-adjusting encryption of the first or second stored columns;
    executing the encrypted query at the database system, without decrypting any of the encrypted data items to plaintext at the database system, to produce one or more encrypted results;
    decrypting the encrypted results using the selected decryption scheme for each data item in the encrypted results to generate decrypted results; and
    returning the decrypted results to the application.

2. The method of claim 1 wherein the transformation occurs in a database proxy placed between the application and the database system.

3. The method according to claim 1 wherein the transformation of the input query occurs in an ORM library or layer used by the application.

4. The method according to claim 1 wherein the transformation of the input query occurs in a database server.

5. The method according to claim 1 wherein the transformation of the input query occurs in the application.

6. The method according to claim 1 wherein the execution of the encrypted query in the database system is done using a user-defined function and SQL operators.

7. The method according to claim 1 wherein the execution of the encrypted query in the database system is done by modifying a user-defined function of the database system.

8. The method according to claim 1 wherein decrypting the encrypted results includes performing further query processing as required by the input query.

9. The method according to claim 1, wherein one or more of the data items in the database are encrypted using two or more encryption schemes.

10. The method according to claim 1, wherein one or more of the data items in the database are encrypted using two or more encryption schemes as layers.

11. The method according to claim 10, wherein transforming the input query includes decrypting one or more of the layers to adjust a current layer of encryption according to the input query.

12. The method according to claim 10, wherein executing the encrypted query includes selecting the layers of encryption according to the input query.

13. The method according to claim 10, wherein executing the encrypted query includes decrypting one or more layers to adjust a current layer of encryption according to the query.

14. The method according to claim 10, wherein the layers of encryption include increasing a level of functionality of the encryption moving toward inner layers of the encryption layers.

15. The method according to claim 10, wherein the layers of encryption include increasing a level of security of the encryption moving toward outer layers of the encryption layers.

16. The method according to claim 1 wherein selecting the encryption scheme is done at run-time when the input query arrives.

17. The method according to claim 1 wherein selecting the encryption scheme is done based on application code before run-time.

18. The method according to claim 1, wherein the database management system does not learn the first or second keys or content of the data in the first column.

19. The method according to claim 1, further including providing an annotation language to specify application access control for one or more data items.

20. The method according to claim 1, wherein encrypting a data item is done using one out of two or more keys based on access control policy of the application.

21. The method according to claim 20, wherein the encryption key is derived from a user's password.

22. The method of claim 1 wherein the two or more encryption schemes include homomorphic encryption (HOM) and order-preserving encryption (OPE).

23. An article, comprising:
a non-transitory computer readable medium having stored instructions that enable a machine to perform processing of database queries by:
encrypting a database in a database system using two or more encryption schemes, with each data item in the database encrypted using at least one of the two or more encryption schemes;
selecting for each data item specified in an input query from an application, one of the encryption schemes;
transforming the input query to an encrypted query using the selected encryption scheme for each data item specified in the query;
determining the input query requests a join between a stored first column initially encrypted with a first key and a stored second column encrypted with a second key different from the first key;
providing a token to the database system for adjusting an encryption of the first stored column to an encryption with the second key to match an encryption of the stored second column, wherein subsequent join queries between the stored first column and the stored second column can be executed without re-adjusting encryption of the first or second stored columns;
executing the encrypted query at the database system, without decrypting any of the encrypted data items to plaintext at the database system, to produce one or more encrypted results;
decrypting the encrypted results using the selected decryption scheme for each data item in the encrypted results to generate decrypted results; and
returning the decrypted results to the application.

24. The article according to claim 23, wherein one or more of the data items in the database are encrypted using two or more encryption schemes as layers.

25. The article of manufacture of claim 23 wherein the transformation occurs in a database proxy placed between the application and the database system.

26. The article of manufacture of claim 23 wherein the transformation of the input query occurs in an ORM library or layer used by the application.

27. The article of manufacture of claim 23 wherein the transformation of the input query occurs in a database server.

28. The article of manufacture of claim 23 wherein the transformation of the input query occurs in the application.

29. The article of manufacture of claim 23 wherein the execution of the encrypted query in the database system is done using a user-defined function and SQL operators.

30. The article of manufacture of claim 23 wherein the execution of the encrypted query in the database system is done by modifying a user-defined function of the database system.

31. The article of manufacture of claim 23 wherein decrypting the encrypted results includes performing further query processing as required by the input query.

32. The article of manufacture of claim 23 wherein the two or more encryption schemes include homomorphic encryption (HOM) and order-preserving encryption (OPE).

* * * * *